(12) United States Patent
Seo

(10) Patent No.: US 12,365,292 B2
(45) Date of Patent: Jul. 22, 2025

(54) DISPLAY APPARATUS FOR VEHICLE

(71) Applicant: HYUNDAI MOBIS CO., LTD., Seoul (KR)

(72) Inventor: Jun Seong Seo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 222 days.

(21) Appl. No.: 18/069,323

(22) Filed: Dec. 21, 2022

(65) Prior Publication Data

US 2023/0339319 A1 Oct. 26, 2023

(30) Foreign Application Priority Data

Apr. 26, 2022 (KR) .................. 10-2022-0051666

(51) Int. Cl.
| | |
|---|---|
| *B60K 35/00* | (2024.01) |
| *B60K 35/22* | (2024.01) |
| *B60K 35/53* | (2024.01) |
| *B60R 11/00* | (2006.01) |
| *B60R 11/02* | (2006.01) |

(52) U.S. Cl.
CPC .......... *B60K 35/00* (2013.01); *B60R 11/0229* (2013.01); *B60K 35/22* (2024.01); *B60K 35/53* (2024.01); *B60K 2360/48* (2024.01); *B60R 2011/0092* (2013.01)

(58) Field of Classification Search
CPC ........ B60K 35/00; B60K 35/53; B60K 35/22; B60K 2360/48; B60R 11/0229; B60R 2011/0092
See application file for complete search history.

(56) References Cited

U.S. PATENT DOCUMENTS

2018/0088577 A1* 3/2018 Kim .................. B60W 30/00
2022/0253103 A1* 8/2022 Choi .................. G09F 9/301

FOREIGN PATENT DOCUMENTS

KR 2005-0066073 A 6/2005

* cited by examiner

*Primary Examiner* — Andrew J Cromer
(74) *Attorney, Agent, or Firm* — NovoTechIP International PLLC

(57) ABSTRACT

A display apparatus for a vehicle according to one embodiment of the present invention includes a screen unit of which a position is adjusted according to a normal driving mode and an autonomous driving mode of a vehicle to output a preset screen suitable for the corresponding mode, a screen position driver configured to adjust the position of the screen unit with a constant speed and a predetermined path according to a control signal to be input, a sensing unit configured to move together with the screen unit while being located at both ends of the screen unit in a longitudinal direction and measure the position and inclination of the screen unit with an amount of light, and a controller configured to determine a real-time position and inclination of the screen unit according to the amount of light measured from the sensing unit to control the driver.

19 Claims, 14 Drawing Sheets

DISPLAY APPARATUS FOR VEHICLE

CROSS-REFERENCE TO RELATED APPLICATIONS

This application claims the benefit under 35 USC 119(a) of Korean Patent Application No. 10-2022-0051666, filed on Apr. 26, 2022, in the Korean Intellectual Property Office, the entire disclosure of which is incorporated herein by reference.

TECHNICAL FIELD

The present invention relates to a display apparatus for a vehicle.

BACKGROUND

A display apparatus for a vehicle provides appropriate content according to a driving condition.

Recently, since an infotainment function in a vehicle has been actively developed for autonomous driving, it is advantageous to secure a field of view when an enlarged display is driven in a separate manner.

As part of this, a selective exposure manner can be applied by driving a display apparatus with a slide, but this manner has a problem in that stable driving is difficult when an enlarged display is elongated in a lateral direction.

That is, for the stable driving of this manner, solutions from various angles need to be found such as measuring an inclination or the like is required to control power at both ends of the display, and separate measures by an external force are required.

SUMMARY

The present invention is directed to providing a display apparatus for a vehicle capable of accurately controlling the moving driving and speed of a screen unit, and ensuring safety through emergency driving stop when an external force is generated.

The problems to be solved by the present invention is not limited to the above-mentioned problem, and other problems not mentioned herein will be clearly understood by those skilled in the art from the following disclosure.

A display apparatus for a vehicle according to one embodiment of the present invention includes: a screen unit of which a position is adjustable according to a normal driving mode and an autonomous driving mode of a vehicle to output a preset screen suitable for the corresponding mode; a driver configured to adjust the position of the screen unit with a constant speed and a predetermined path according to a control signal to be input; a sensing unit configured to move together with the screen unit while being located at both ends of the screen unit in a longitudinal direction and measure the position and inclination of the screen unit with an amount of light; and a controller configured to determine a real-time position and inclination of the screen unit according to the amount of light measured from the sensing unit to control the driver.

The driver may include: an actuator; a driving shaft connected to the actuator to rotate; a pinion gear connected to the driving shaft to rotate in conjunction with the driving shaft; a support member having an arch-shaped slit configured to guide a moving path of the driving shaft; a rack gear engaged with the pinion gear while being connected to the support member; and a moving bracket connected to the driving shaft while being coupled to the screen unit to move together with the screen unit when the pinion gear moves along the rack gear due to the driving shaft.

Here, the moving bracket may have the sensing unit coupled to an upper end thereof so that the sensing unit may transmit and receive light with the support member interposed therebetween to move along an upper end of the support member.

The support member may include a plurality of measurement holes formed in a peripheral portion of the slit at intervals along a longitudinal direction of the slit, and the measurement holes may be located between positions where the sensing unit transmits and receives the light.

The measurement holes may be located in a group unit of diameters having different sizes.

The sensing unit may include: a fixing panel coupled to an upper end of the moving bracket; a first substrate fixed to one end portion of the fixing panel in a downward direction and including a light-emitting sensor; and a second substrate fixed to the other end portion of the fixing panel in a downward direction and including a light-receiving sensor having a predetermined separation distance so that the measurement holes are located between the light-emitting sensor and the light-receiving sensor.

The controller may control the driver to minimize the exposure of a display region of the screen unit within a preset range in the normal driving mode of the vehicle, and may control the driver to maximize the exposure of the display region of the screen unit within the preset range in the autonomous driving mode of the vehicle.

The controller may stop the driving of the driver when it is determined that the screen unit is inclined to one side compared to a reference through a measurement result of the amount of light from the sensing unit.

Meanwhile, a display apparatus for a vehicle according to another embodiment of the present invention includes: a screen unit of which a position is adjustable according to a normal driving mode in which a partial region is exposed on a cockpit module and an autonomous driving mode in which an entire region is exposed, and configured to output the corresponding screen; a sensing unit configured to move together with the screen unit while being located at both ends of the screen unit in a longitudinal direction and measure the position and inclination of the screen unit with an amount of light; and a driver configured to determine a real-time position and inclination of the screen unit according to the amount of light measured from the sensing unit to adjust a position of the screen unit for each mode with a constant speed and a predetermined path.

The driver may include: an actuator; a driving shaft connected to the actuator to rotate; a pinion gear connected to the driving shaft to rotate in conjunction with the driving shaft; a support member including an arch-shaped slit configured to guide a moving path of the driving shaft, and a plurality of measurement grooves having open one surfaces and formed in a peripheral portion of the slit at different intervals along a longitudinal direction of the slit; a rack gear engaged with the pinion gear while being connected to the support member; and a moving bracket connected to the driving shaft while being coupled to the screen unit to move together with the screen unit when the pinion gear moves along the rack gear due to the driving shaft.

Here, the moving bracket may have the sensing unit coupled to an upper end thereof so that the sensing unit may move along an upper end of the support member.

The measurement grooves may be located between positions where the sensing unit transmits and receives the light.

The sensing unit may include: a fixing panel coupled to an upper end of the moving bracket; a first substrate fixed to one end portion of the fixing panel in a downward direction and including a light-emitting sensor facing the other end portion of the fixing panel; and a second substrate fixed to the other end portion of the fixing panel in a downward direction and including a light-receiving sensor having a predetermined separation distance so that the measurement grooves are located between the light-emitting sensor and the light-receiving sensor.

The moving bracket may be formed in a 'C' shape encompassing the support member and the pinion gear.

On the other hand, a display apparatus for a vehicle according to still another embodiment of the present invention includes: a screen unit configured to output the corresponding screen according to a normal driving mode in which a partial region is exposed on a cockpit module and an autonomous driving mode in which an entire region is exposed; and a driver configured to adjust a position of the screen unit for each mode through rotation pop-up.

In this case, when the position of the screen unit is adjusted, the driver may control driving according to a measured current value according to the corresponding load when a load is applied to an actuator by an external force.

The screen unit may output only relatively simple basic information related to a vehicle speed, a driving direction, and a sound source to the screen in the normal driving mode.

The screen unit may output a screen in which vehicle driving information and entertainment information are collected through a plurality of graphical user interfaces (GUIs) in the autonomous driving mode.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
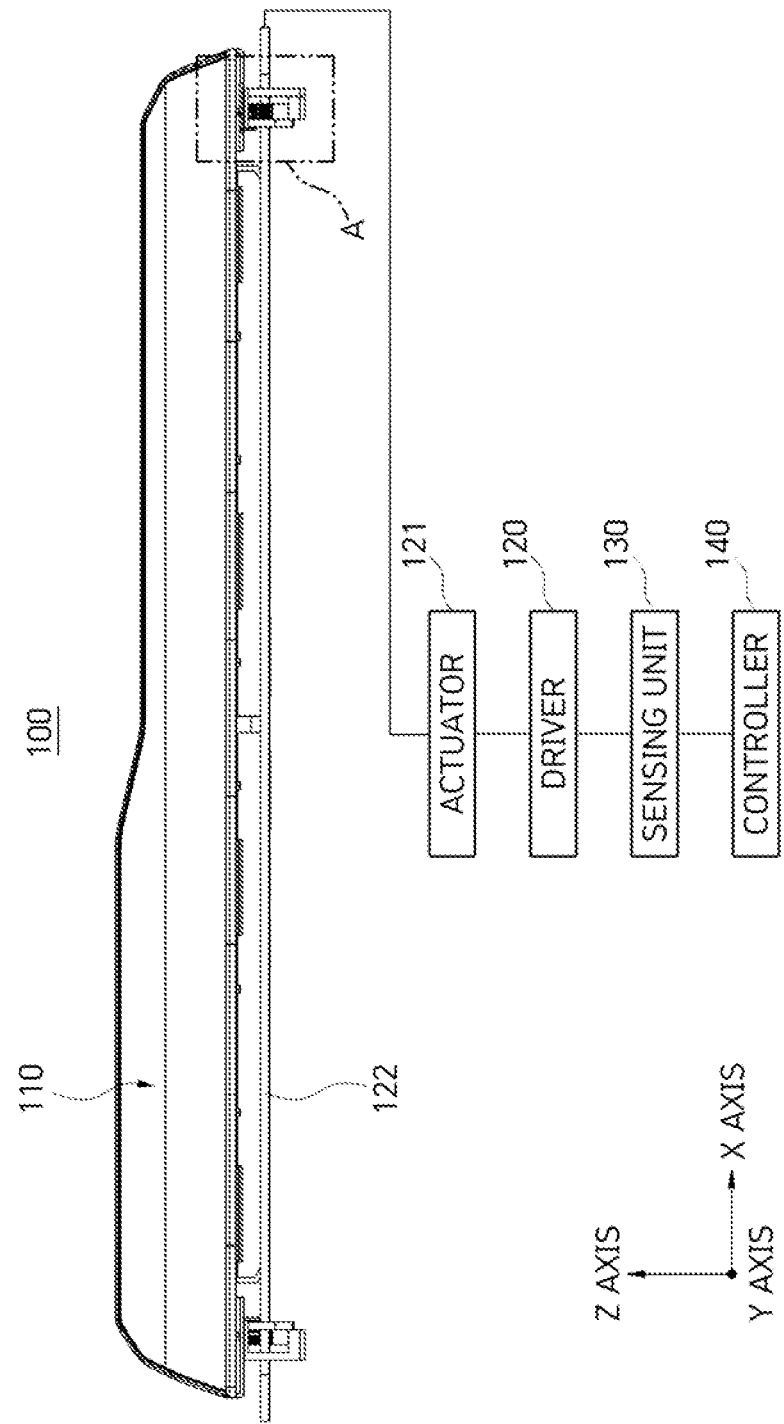
FIG. 1 is a front configuration diagram schematically illustrating a display apparatus for a vehicle according to one embodiment of the present invention.

Advantages and features of the present invention, and a method of achieving them, will be apparent with reference to embodiments which is described in detail in conjunction with the accompanying drawings. However, the present invention is not limited to the embodiments which will be described below and may be implemented in different forms. The embodiments are only provided to completely disclose the present invention and completely convey the scope of the present invention to those skilled in the art, and the present invention is defined by the disclosed claims. Meanwhile, terms used in the present specification are provided not to limit the present invention but to describe the embodiments. In the present specification, the singular form is intended to also include the plural form unless the context clearly indicates otherwise. The terms 'comprise' and/or 'comprising' as used herein do not preclude the presence or addition of at least one other component, step, operation, and/or element other than the mentioned components, steps, operations and/or elements. As used in the present specification, the term "and/or" includes any one and all combinations of one or more of those listed items.

Hereinafter, preferable embodiments of the present invention will be described in detail with reference to the accompanying drawings.

Coordinate System Display

X, Y, and Z axes shown in the drawings of the present invention represent a three-dimensional Cartesian coordinate system which displays coordinates of points or vectors with respect to straight-line coordinate axes orthogonal to each other. In the corresponding coordinate system with respect to a vehicle body for convenience of description, the X axis is an axis facing sides in a width direction of the vehicle body, the Y axis is an axis facing in a longitudinal direction, and the Z axis is an axis facing a top and a bottom (a ceiling and a floor) of the vehicle body. Further, X, Y, and Z axis directions include positive directions and negative directions of the axes.

A positive direction of the X-axis refers to a right side in the lateral direction, and a negative direction of the X-axis refers to a left side in the lateral direction. A positive direction of the Y-axis refers to a front with respect to the longitudinal direction of the vehicle body, and a negative direction of the Y-axis refers to a rear with respect to the longitudinal direction of the vehicle body. A positive direction of the Z-axis refers to a direction toward the ceiling of the vehicle body, and a negative direction of the Z-axis refers to a direction toward the floor of the vehicle body.

The positive and negative directions of each axis may be collectively described based on the same or different specific reference points for convenience of description.

For example, in the present invention, the positive direction of the X-axis refers to the right side in the lateral direction, and the negative direction of the X-axis refers to the left side in the lateral direction, but the positive and negative directions may be determined through any one reference point, and the reference point may be different according to each structure.

Basic Configuration

FIG. 1 is a front configuration diagram schematically illustrating a display apparatus for a vehicle according to one embodiment of the present invention.

A display apparatus 100 for a vehicle includes a screen unit 110, a screen position driver 120, a sensing unit 130, and a controller 140.

The screen unit 110 outputs vehicle driving information and a screen for each function. The screen unit 110 is a large screen display, and has a larger basic size and greater performance compared to a conventional display (not shown) providing only vehicle driving information.

The screen unit 110 may provide more comfortable and convenient information (for example, infotainment information or the like) to the passenger on the screen when using an autonomous driving mode which has become more common due to technological development. For example, the screen unit 110 may output a screen in which vehicle driving information and entertainment information are collected through a plurality of graphical user interfaces (GUIs) in the autonomous driving mode. In this case, in the screen unit 110, a display region to be displayed is maximized within a preset range to output information necessary for the corresponding mode.

In the screen unit 110, when a normal driving mode is used instead of the autonomous driving mode, the display region to be displayed may be minimized within the preset range to provide only information necessary for driving. For example, the screen unit 110 may output only relatively simple and basic information related to a vehicle speed, a driving direction, and a sound source to the screen in the normal driving mode.

As a result, since a position of the screen unit 110 is adjustable according to the normal driving mode and the autonomous driving mode of the vehicle, the screen unit 110 outputs a preset screen suitable for the corresponding mode.

The screen position driver (hereinafter "driver") 120 adjusts the position of the screen unit 110 with a constant speed and a predetermined path according to a control signal to be input.

The sensing unit 130 moves together with the screen unit while being located at both ends of the screen unit 110 in a longitudinal direction and measure the position and inclination of the screen unit 110 with an amount of light.

The controller 140 determines a real-time position and inclination of the screen unit 110 according to the amount of light measured from the sensing unit 130 to control the driver 120.

The controller 140 also stops the driving of the driver 120 when it is determined that the screen unit 110 is inclined to one side compared to a standard through a measurement result of the amount of light from the sensing unit 130. Since this case may be normally caused in a process in which a user (passenger or the like) accidentally or unintentionally presses the screen unit 110 in driving or a hand into a gap between paths is inserted, emergency driving stop may be important in terms of stability. The controller 140 may have a control logic limited to the corresponding functions (the functions which are listed above) or may be an electronic control unit (ECU) of a vehicle.

As a result, the display apparatus 100 for a vehicle may secure driving stability by causing the controller 140 to accurately control the moving of the screen unit 110 through the amount of light measured from the sensing unit 130. Further, since emergency driving stop is possible when an external force (for example, a user's forcible press, insertion of a hand, or the like), safety may also be secured, and since the driver 120 urgently stops, a device failure due to excessive driving may be prevented.

Figure 2:
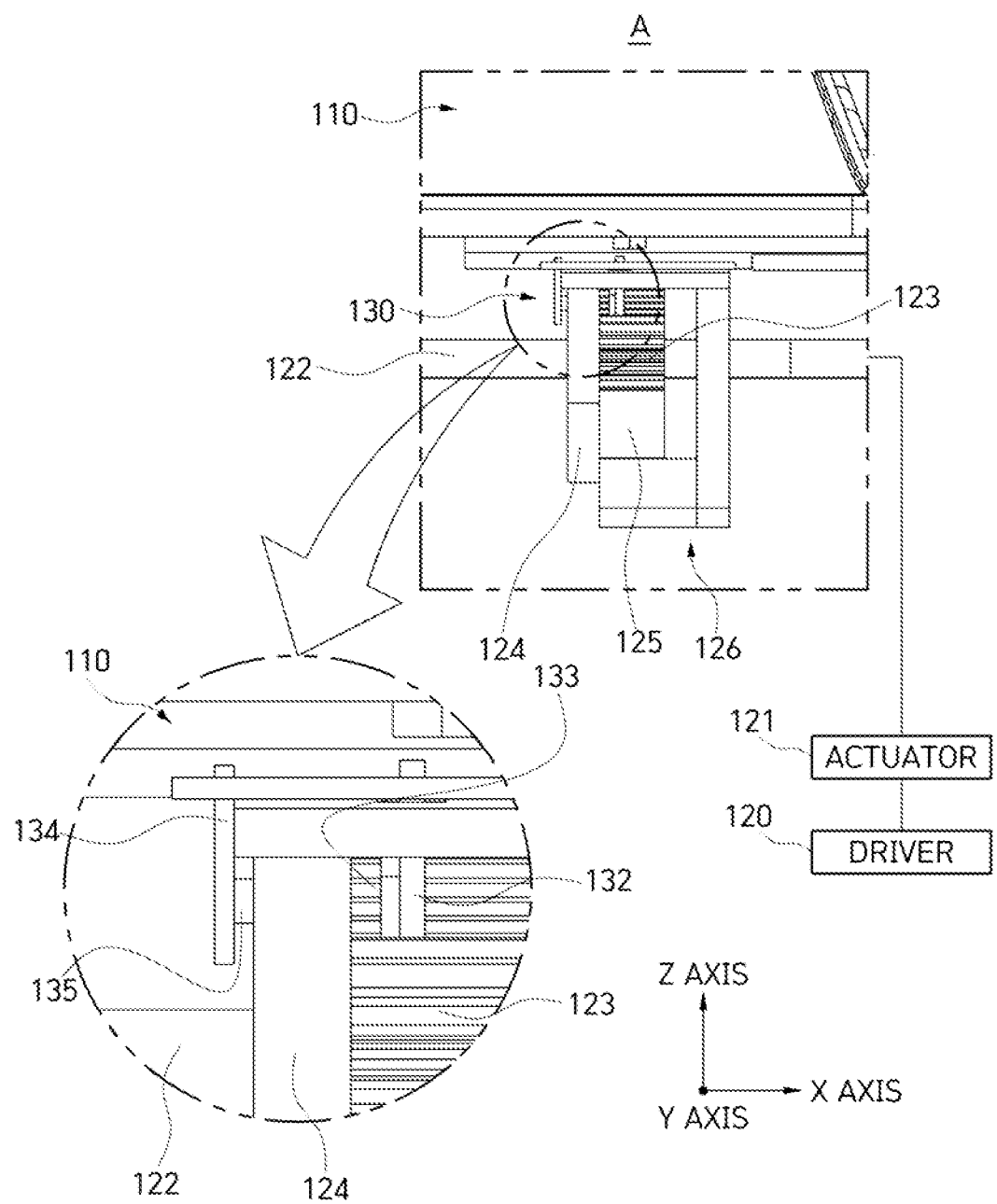
FIG. 2 is an enlarged view of the configuration of portion A shown in FIG. 1.

FIG. 2 is an enlarged view of the configuration of portion A shown in FIG. 1.

The position of the screen unit 110 is adjusted by the driver 120.

The driver 120 includes an actuator 121, a driving shaft 122, a pinion gear 123, a support member 124, a rack gear 125, and a moving bracket 126.

The driver 120 may transfer a driving force to one end or both ends of the screen unit 110 to correct the position of the screen unit 110.

The actuator 121 is a generic term for a motor using electricity, hydraulic pressure, compressed air, or the like.

The actuator 121 has a driving shaft, and here, the driving shaft may function as a shaft of the actuator 121 or may be connected to a separate rotary shaft (not shown) provided in the actuator 121 to rotate.

The actuator 121 may be installed on the driving shaft 122 to adjust lateral positions of the screen unit 110.

A length of the driving shaft 122 may be a size at least as long as a length of the screen unit 110.

The pinion gear 123 is connected to the driving shaft 122 to rotate in conjunction with the driving shaft 122.

The support member 124 guides a moving path of the driving shaft 122.

The rack gear 125 is engaged with the pinion gear 123 while being connected to the support member 124. The rack gear 125 is basically fixed in a cockpit to provide a moving path of the pinion gear 123. The pinion gear 123 in this case moves in conjunction with the screen unit 110 (basic embodiment).

As another example (modified embodiment; not shown), the pinion gear 123 may adjust a position of the rack gear 125 while rotating in place. The pinion gear 123 in this case may not be interlocked with the screen unit 110 and may be fixed to a separate position in the cockpit while being rotatable in place, and the rack gear 125 may move in conjunction with the screen unit 110.

The moving bracket 126 is connected to the driving shaft 122 while being coupled to the screen unit 110. The moving bracket 126 moves together with the screen unit 110 when the pinion gear 123 moves along the rack gear 125 due to the driving shaft 122.

A first substrate 132 and a second substrate 134 are inserted into and fixed to an upper end of the moving bracket 126 while being spaced apart from each other. A light-emitting sensor 133 is electrically connected to the first substrate 132, and a light-receiving sensor 135 is electrically connected to the second substrate 134. The light-emitting sensor 133 and the light-receiving sensor 135 are spaced apart while facing each other, and an upper end of the support member 124 is located between the light-emitting sensor 133 and the light-receiving sensor 135 which are spaced apart from each other.

That is, the moving bracket 126 has the sensing unit 130 coupled to the upper end so that the sensing unit 130 transmits and receives light through the light-emitting sensor 133 and the light-receiving sensor 135 with the support member 124 therebetween and moves along the upper end of the support member 124 to sense the real-time position and inclination of the screen unit 110 by causing the light to be transmitted and received between a plurality of measurement holes (124*b* in FIG. 3) formed in the upper end of the support member 124.

Figure 3:
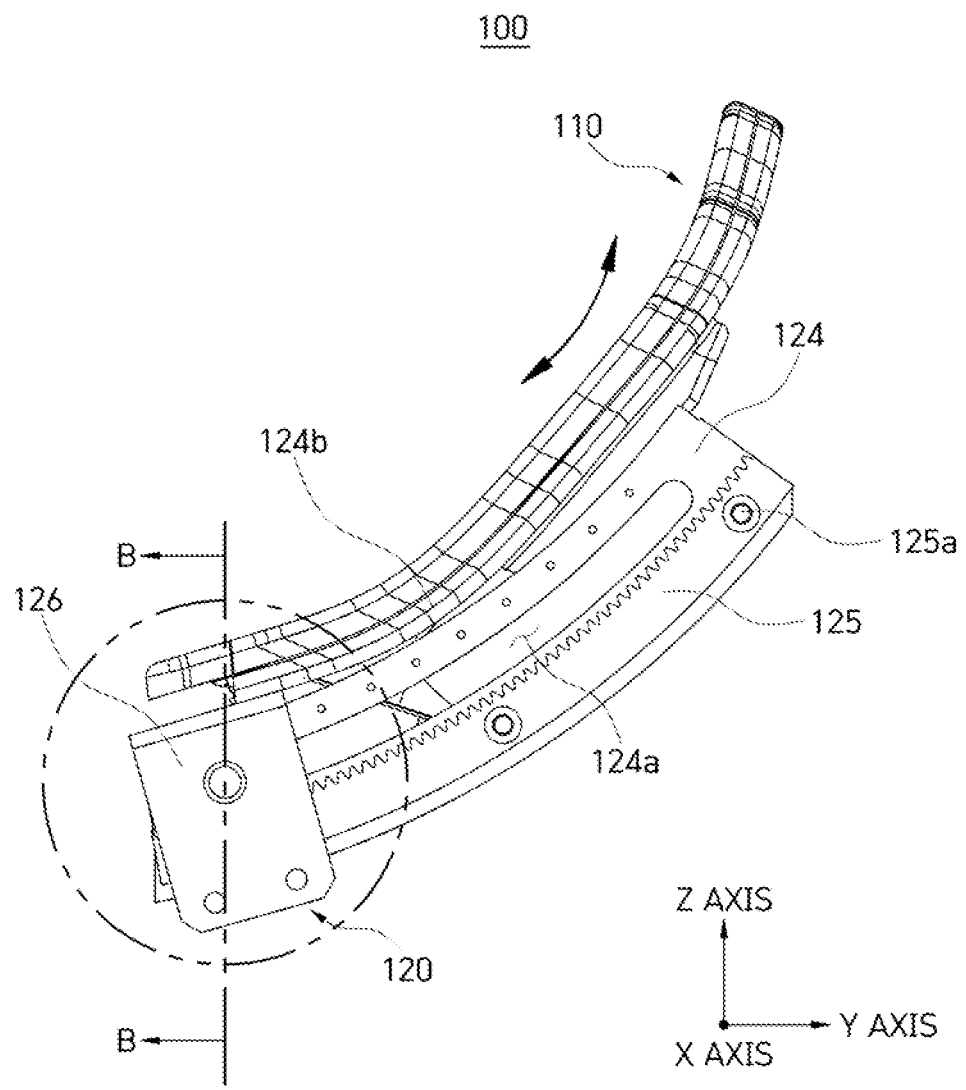
FIG. 3 is a side view for describing an operation mechanism concept of the display apparatus for a vehicle according to one embodiment of the present invention.

FIG. 3 is a side view for describing an operation mechanism concept of the display apparatus for a vehicle according to one embodiment of the present invention.

The screen unit 110 may move by rotation in a swivel manner due to the driver 120. To this end, the support member 124 includes a slit 124*a* and a plurality of measurement holes 124*b*.

The slit 124*a* is formed of an arch-shaped hole in the support member 124. This slit 124*a* guides position movement of the driving shaft 122.

The plurality of measurement holes 124*b* are formed in a peripheral portion of the slit 124*a* at intervals along a longitudinal direction of the slit 124*a*. The measurement holes 124*b* may be located between positions where the sensing unit (130 in FIG. 1) transmits and receives the light.

Figure 4:
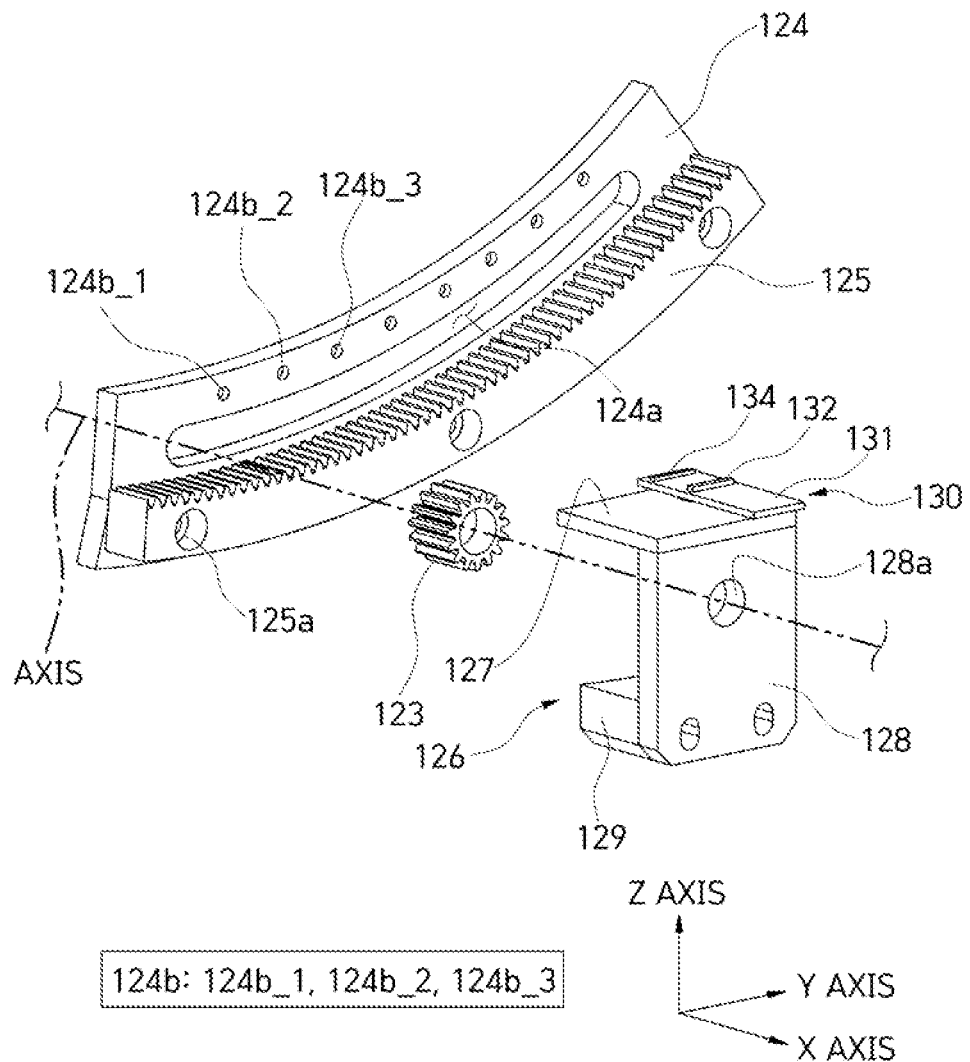
FIG. 4 is an exploded perspective view of a partial configuration of a driver in the display apparatus for a vehicle according to one embodiment of the present invention.

FIG. 4 illustrates an exploded perspective view of a partial configuration of the driver.

The support member 124 is formed in an upwardly inclined arch shape, and has an arch-shaped slit 124*a* formed therein. Further, the support member 124 has a structure in which a plurality of measurement holes 124*b*_1, 124*b*_2, and 124*b*_3 are formed at intervals along the longitudinal direction.

For example, a first measurement hole 124*b*_1, a second measurement hole 124*b*_2, and a third measurement hole 124*b*_3 may be formed to be spaced apart from each other, and may be located in a group unit of diameters having different sizes. The first measurement hole 124*b*_1, the second measurement hole 124*b*_2, and the third measurement hole 124*b*_3 may serve as a barometer for measuring the amount of light transmitted and received between the first substrate 132 and the second substrate 134.

The rack gear 125 located on a peripheral portion under the plurality of measurement holes 124*b*_1, 124*b*_2, 124*b*_3 has a plurality of sawteeth formed on an upper end portion thereof, and has a plurality of bolting holes 125*a* at intervals along the longitudinal direction. The rack gear 125 may be fixed to a side surface of the support member 124 by bolting while being located at a lower end of the slit 124*a*.

The pinion gear 123 is engaged with the sawteeth formed on the upper end of the rack gear 125 while being associated with the slit 124*a* along an axis.

The moving bracket 126 is formed in a 'C' shape in which an upper panel 127, a side panel 128, and a lower panel 129 are connected.

The sensing unit 130 is located on an upper end of the upper panel 127. A fixing panel 131 of the sensing unit 130 is coupled to the upper end of the upper panel 127 in surface contact with each other. The first substrate 132 and the second substrate 134 fixed to the fixing panel 131 while being spaced apart from each other protrude in a downward direction through the upper panel 127.

The side panel 128 has a shaft hole 128*a* associated with the pinion gear 123 and the slit 124*a* along an axis. Here, the shaft hole 128*a* may have a larger diameter than the driving shaft (122 in FIG. 2), and more preferably, may include a bearing (not shown) corresponding to the driving shaft (122 in FIG. 2) on the shaft hole 128*a* to prevent a friction load.

The lower panel 129 is fixed orthogonally to the side panel 128 and is located on a lower end portion of the rack gear 125 when the side panel 128 is assembled.

In summary, the moving bracket 126 is formed in the 'C' shape, and moves in conjunction with the pinion gear 123 along an axis. In other words, when the pinion gear 123 moves along the rack gear 125, the moving bracket 126 may move along the longitudinal direction of the support member 124 while encompassing upper and lower end portions of the support member 124.

Figure 5:
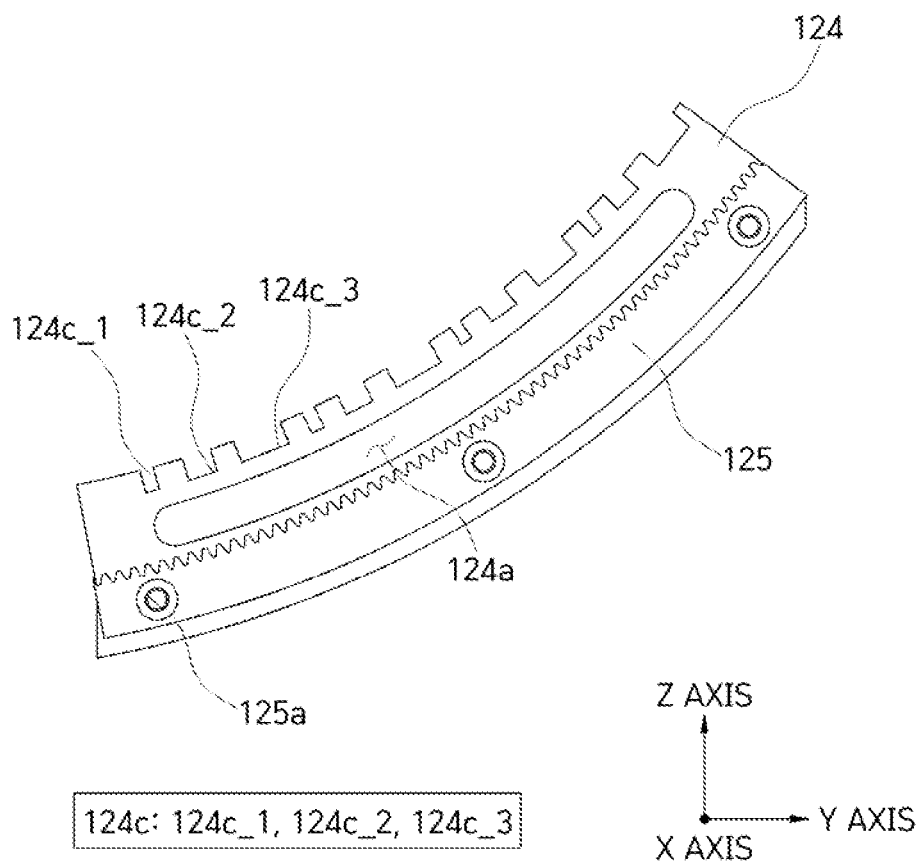
FIGS. 5 and 6 are exemplary diagrams illustrating measurement grooves of a support member in the display apparatus for a vehicle according to one embodiment of the present invention.
Figure 6:
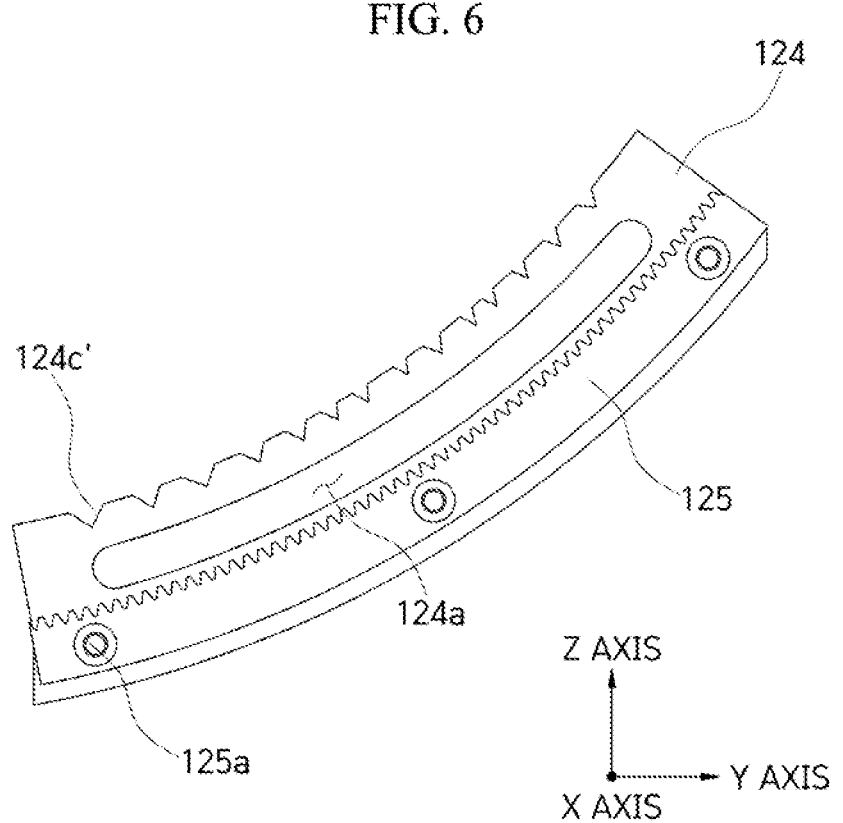

Meanwhile, as shown in FIGS. 5 and 6, the support member 124 may have a plurality of measurement grooves 124*c* and 124*c'* formed for adjusting the amount of light.

Each of a first measurement groove 124*c*_1, a second measurement groove 124*c*_2, and a third measurement groove 124*c*_3 shown in FIG. 5 is formed in a sawtooth shape with open one surface in the upper peripheral portion of the slit 124*a*. The first measurement groove 124*c*_1, the second measurement groove 124*c*_2, and the third measurement groove 124*c*_3 may be located in a group unit of different widths so that the amount of light may be measured.

A plurality of measurement grooves 124*c'* shown in FIG. 6 may have a zigzag shape of inverted triangular shapes having open one surfaces, and may function so that the amount of light of the sensing unit (130 in FIG. 4) may be measured.

Figure 7:
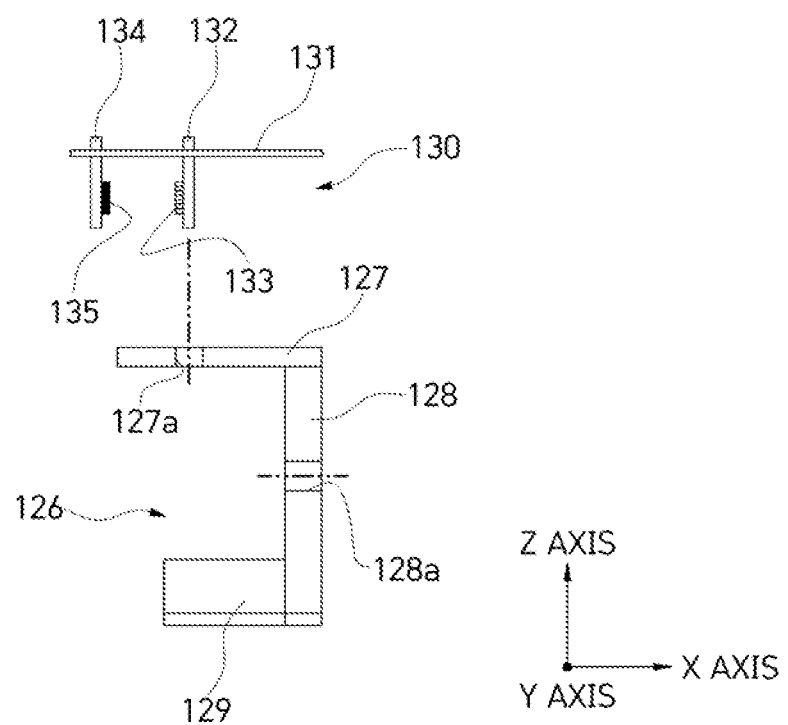
FIGS. 7 and 8 are exemplary diagrams illustrating a process in which a sensing unit is coupled to a moving bracket in the display apparatus for a vehicle according to one embodiment of the present invention.
Figure 8:
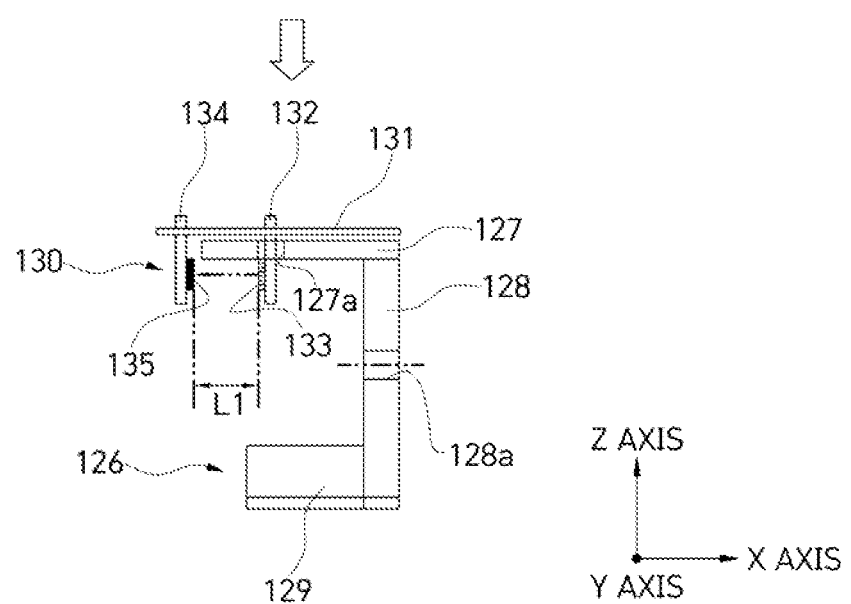

FIGS. 7 and 8 illustrate a process in which the sensing unit is coupled to the moving bracket in the display apparatus for a vehicle according to one embodiment of the present invention.

Since the configurations of the moving bracket 126 and the sensing unit 130 have been described above, overlapping descriptions will be omitted. However, necessary descriptions which are meaningful in a process of coupling each component will be supplemented or added.

The sensing unit 130 moves together with the moving bracket 126 to measure the amount of light while being fixed to the upper end of the moving bracket 126.

To this end, the fixing panel 131 comes into surface contact with the upper end of the upper panel 127, and the first substrate 132 and the second substrate 134 which are provided while being spaced apart from each other in the fixing panel 131 are fixed to the fixing panel 131 in a downward direction.

The first substrate 132 is fixed to the fixing panel 131 in the downward direction and includes the light-emitting sensor 133. The light-emitting sensor 133 may be an infrared light-emitting diode (IR LED) or a laser diode as a light source. In this case, the light-emitting sensor 133 may be electrically connected to the first substrate 132.

The first substrate 132 protrudes in a downward direction toward a lower end portion of the upper panel 127 through a fastening hole 127*a* of the upper panel 127 when the fixing panel 131 and the upper panel 127 come into surface contact with each other. Here, the fixing panel 131 may be snap-fit fastened to the upper panel 127. The second substrate 134 is fixed to the fixing panel 131 in the downward direction and is spaced apart from the first substrate 132. In this case, the second substrate 134 includes a light-receiving sensor 135 having a predetermined separation distance L1 so that the measurement holes (and/or measurement grooves) are located between the light-emitting sensor 133 and the light-receiving sensor 135.

The light-receiving sensor 135 is a photoelectric element, and receives light irradiated from the light-emitting sensor 133 at a position opposite the light-emitting sensor 133 to transmit the received information to the controller 140.

Operation Mechanism

FIGS. 9 to 14 illustrate an operation mechanism of the display apparatus for a vehicle according to one embodiment of the present invention.

The position of the screen unit 110 may be different for the normal driving mode and the autonomous driving mode. For example, the screen unit 110 may minimize the display region within the preset range in the normal driving mode and may maximize the display region within the preset range in the autonomous driving mode.

Figure 9:
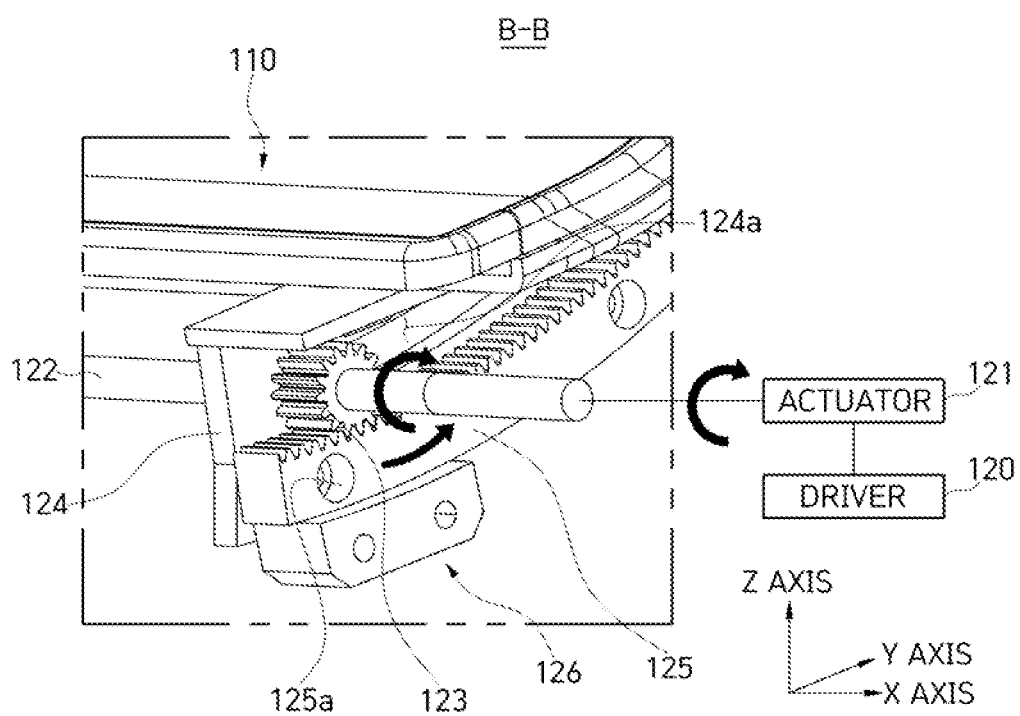
FIG. 9 is an exemplary diagram of an operation partially illustrating an operation relationship between configurations after enlarging cross-section B-B shown in FIG. 3.
Figure 10:
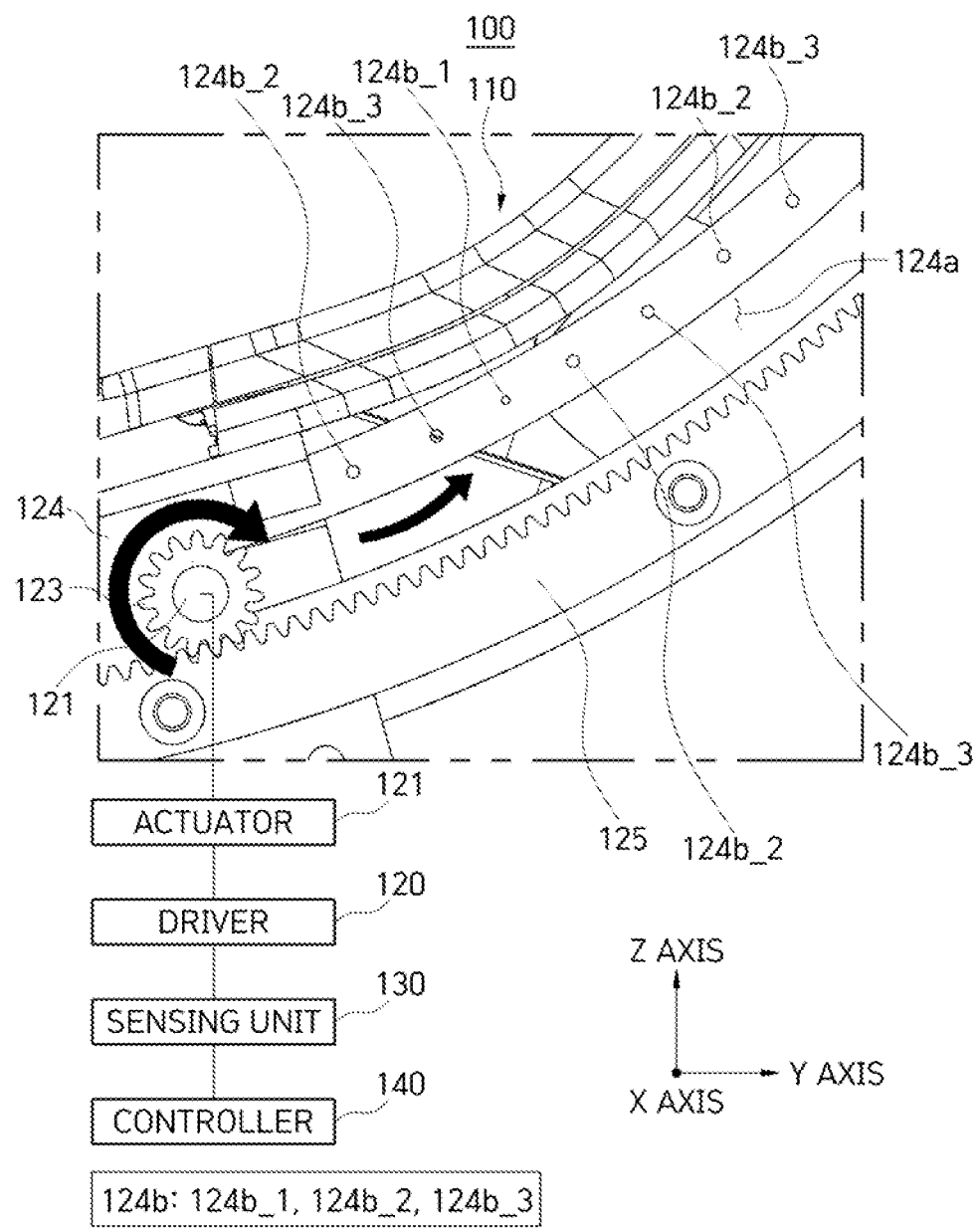
FIG. 10 is an exemplary diagram of an operation illustrating an operation relationship between all configurations of the display apparatus for a vehicle according to one embodiment of the present invention.
Figure 11:
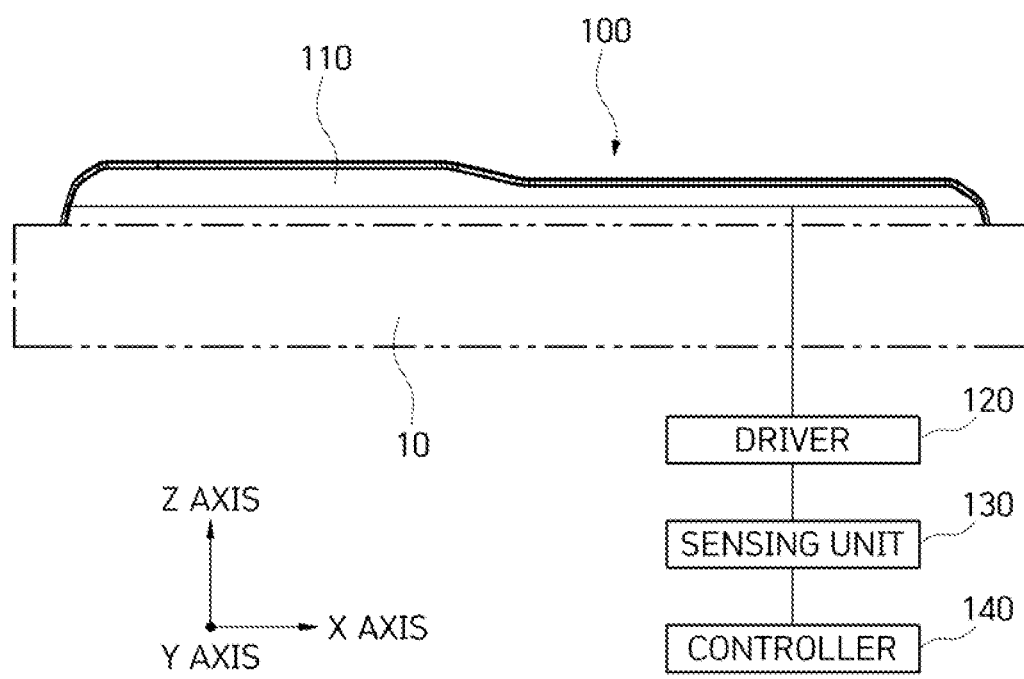
FIG. 11 is an exemplary diagram illustrating a screen unit in a normal driving mode in the display apparatus for a vehicle according to one embodiment of the present invention.
Figure 12:
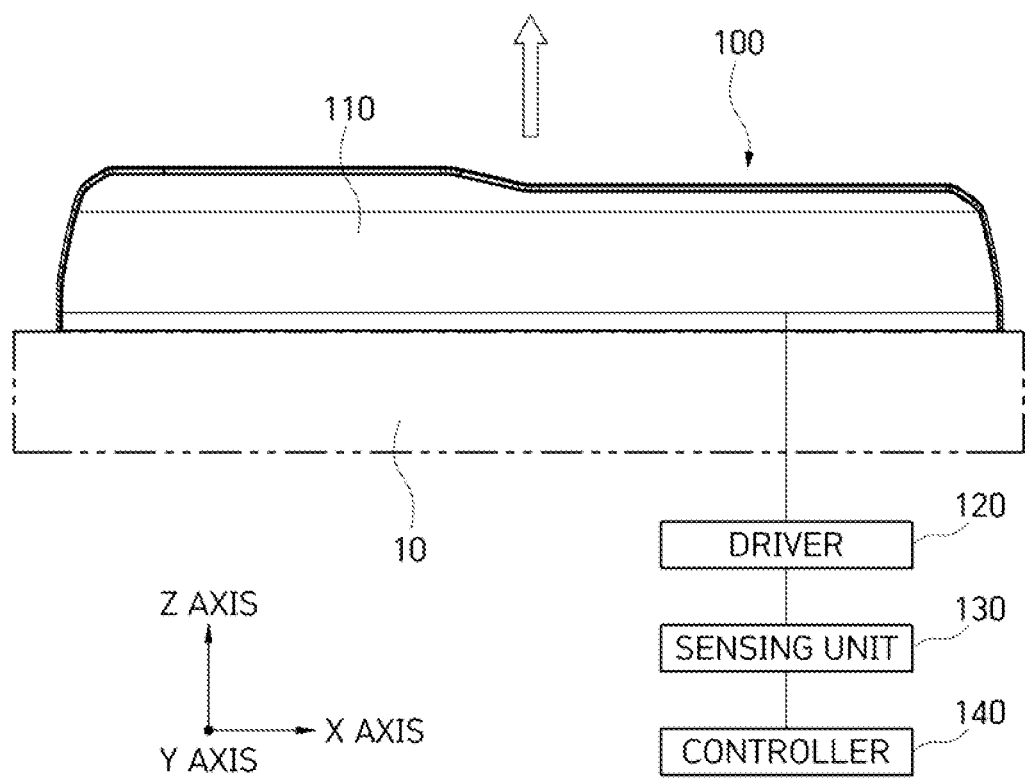
FIG. 12 is an exemplary diagram illustrating the screen unit in an autonomous driving mode in the display apparatus for a vehicle according to one embodiment of the present invention.
Figure 13:
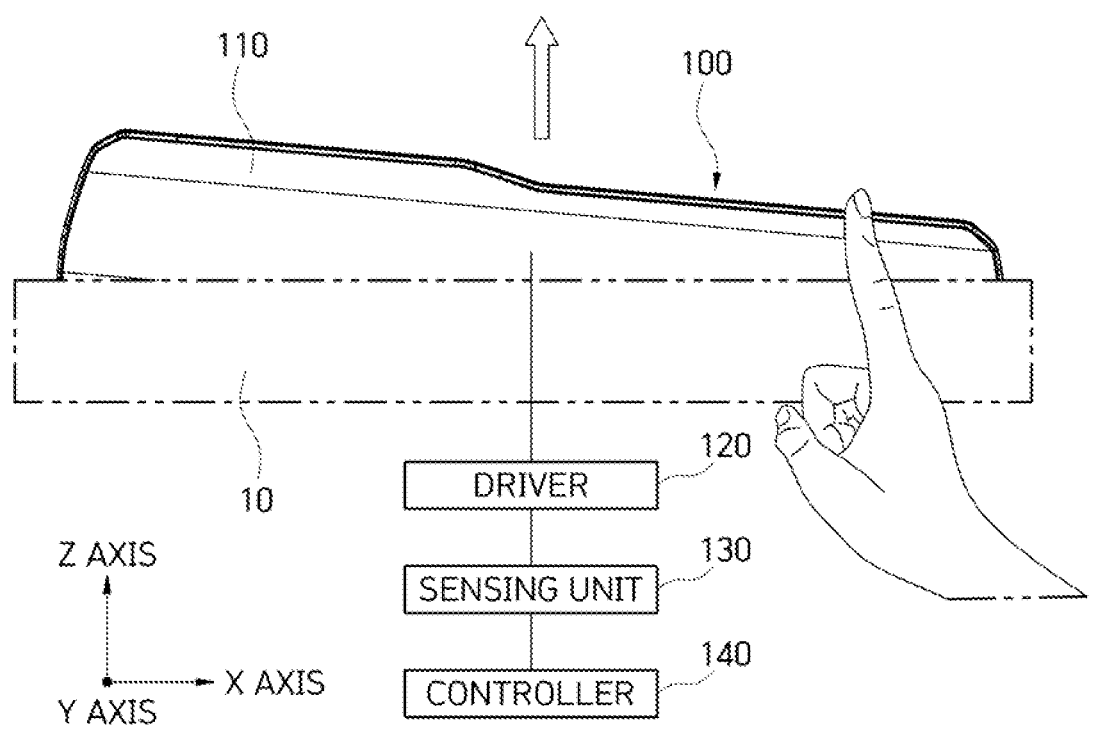
FIG. 13 is an exemplary diagram illustrating the adjustment of a position of the screen unit when an external force is generated in the display apparatus for a vehicle according to one embodiment of the present invention.
Figure 14:
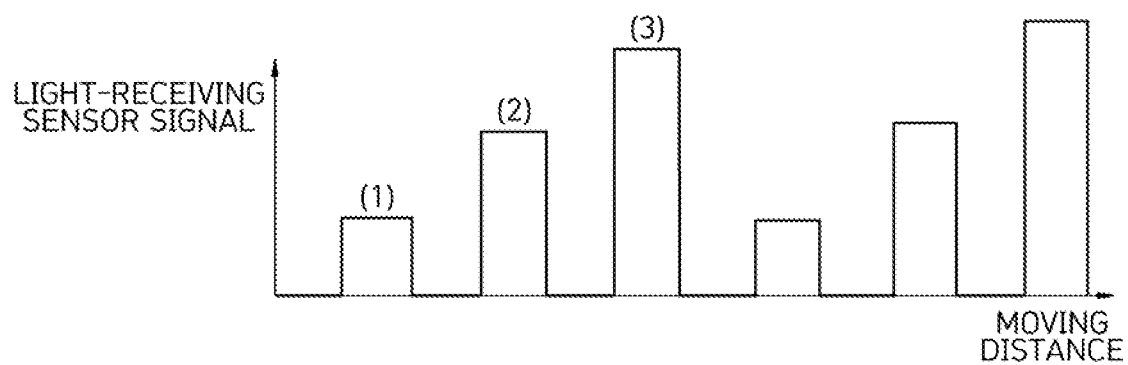
FIG. 14 is an exemplary diagram of a graph schematically illustrating a light-receiving sensor signal for each moving distance of the display apparatus for a vehicle according to one embodiment of the present invention.

As shown in FIGS. 9 and 10, when the actuator 121 of the driver 120 rotates in a clockwise direction (the positive direction of the Y-axis), the pinion gear 123 interlocked with the actuator 121 rotates and moves in the positive direction of the Y-axis along the rack gear 125.

Accordingly, the screen unit 110 may expand a display exposure region while moving in the upward direction. The corresponding process exemplifies a case of the autonomous driving mode, and in the case of the normal driving mode, the pinion gear 123 rotates in a direction opposite the above (the negative direction of the Y-axis), and the components interlocked with the pinion gear 123 may move together.

When the screen unit 110 moves in the upward direction, for movement sensing of the screen unit 110, a real-time position of the screen unit 110 may be grasped through the measurement of the amount of light of the sensing unit 130 according to the position of the screen unit 110.

For example, the sensing unit 130 transmits and receives the light with the group unit measurement holes 124b_1, 124b_2, and 124b_3 of diameters having different sizes therebetween to compare and calculate a signal value of the amount of light measured while passing through the plurality of measurement holes 124b_1, 124b_2, and 124b_3 with a reference value when the moving bracket 126 moves in the upward direction.

The controller 140 grasps lateral positions sensed by the sensing unit 130 located at left and right sides of the screen unit 110, and controls the driver 120 so that the screen unit 110 uniformly moves.

When the signal value of the amount of light measured through the sensing unit 130 is lower than the reference value (for example, an example in FIG. 13), the controller 140 considers that the screen unit 110 moves in an unbalanced state and urgently stops the driving of the driver 120.

The controller 140 receives light amount information (lateral signal values) from the light-receiving sensor 135 of the sensing unit 130 installed at both ends of the screen unit 110 to control and drive the driver 120 when the lateral signal values become the same, and when the corresponding signal values are different, the actuator 121 at one side is stopped and the actuator 121 at the other side is driven to correct the lateral positions.

For example, when a right signal value of the screen unit 110 is (1) and a left signal value is (0), the controller 140 stops the actuator 121 at the right side. Further, when a left signal value becomes (1), the controller 140 simultaneously drives the actuators 121 at the left and right sides.

When the signal values of the left and right sides of the screen unit 110 are different, the controller 140 may correct the lateral positions of the screen unit 110 by recognizing the corresponding driving as Fail and controlling the driver 120 to convert an operation of the actuator 121 at the corresponding side to reverse rotation.

When a load is applied to the actuators 121 at both ends by an external force in the case in which the driver 120 adjusts the position of the screen unit 110, the controller 140 may control driving of the corresponding actuator 121 according to a measured current value according to the corresponding load.

According to the present invention, driving stability can be secured by accurately controlling the moving of a screen unit through measurement of an amount of light, and since emergency driving stop is possible when an external force (for example, a user's forcible press, insertion of a hand, or the like) is generated, safety can also be secured.

Specifically, appropriate content (for example, driving option display, infotainment information, or the like) can be provided by adjusting a display region of the screen unit according to a normal driving mode or an autonomous driving mode.

In the above, configurations of the present invention has been described in detail through the preferable embodiments, but are only examples, and various modifications are possible within the scope of the present invention without departing from the technical spirit of the present invention.

Accordingly, the scope of the present invention should be defined by the following claims.

What is claimed is:

1. A display apparatus for a vehicle comprising:
    a screen unit a position of which is adjustable according to a normal driving mode and an autonomous driving mode of the vehicle to assume a preset screen position depending on whether the vehicle is in the normal driving mode or in the autonomous driving mode;
    a screen position driver configured to adjust the position of the screen unit to control an amount of exposure of a display region of the screen unit with a predetermined speed and a predetermined path;
    a sensing unit located at both ends of the screen unit in a longitudinal direction and configured to move together with the screen unit and measure a position of the screen unit based on an amount of light measured by the sensing unit; and
    a controller configured to determine a real-time position of the screen unit according to amount of light measured by the sensing unit to control the screen position driver to set the amount of exposure of a display region of the screen unit in dependence on whether the vehicle is in the normal driving mode or in the autonomous driving mode.

2. The display apparatus of claim 1, wherein the screen position driver includes:
    an actuator;
    a driving shaft connected to rotate the actuator;
    a pinion gear connected to the driving shaft so as to rotate in conjunction with the driving shaft;
    a support member having an arch-shaped slit configured to guide a moving path of the driving shaft;
    a rack gear engaged with the pinion gear and connected to the support member; and
    a moving bracket connected to the driving shaft and coupled to the screen unit to move together with the screen unit when the pinion gear moves along the rack gear, driven by the driving shaft;
    the moving bracket being provided with the sensing unit coupled to an upper end thereof such that the sensing unit transmits and receives light with the support member interposed therebetween and to move along an upper end of the support member.

3. The display apparatus of claim 2, wherein the support member includes a plurality of measurement holes formed in a peripheral portion of the slit at intervals along a longitudinal direction of the slit, and
the measurement holes are located between positions where the sensing unit transmits and receives the light.

4. The display apparatus of claim 3, wherein the measurement holes are of different diameters.

5. The display apparatus of claim 3, wherein the sensing unit includes:
a fixing panel coupled to an upper end of the moving bracket;
a first substrate fixed to one end portion of the fixing panel in a downward direction and including a light-emitting sensor; and
a second substrate fixed to another end portion of the fixing panel in a downward direction and including a light-receiving sensor having a predetermined separation distance from the light-emitting sensor so that the measurement holes are located between the light-emitting sensor and the light-receiving sensor.

6. The display apparatus of claim 1, wherein the controller controls the screen position driver to minimize the amount of exposure of a display region of the screen unit within a preset range in response to the vehicle being in the normal driving mode, and controls the screen position driver to maximize the amount of exposure of the display region of the screen unit within the preset range in response to the vehicle being in the autonomous driving mode.

7. The display apparatus of claim 1, wherein the controller stops the driving of the screen position driver when it is determined that the screen unit is inclined to one side compared to a reference through a measurement of the amount of light from the sensing unit.

8. The display apparatus of claim 1, wherein:
the screen position driver includes a support member including a plurality of measurement holes formed at intervals along a longitudinal direction of the support members,
the sensing unit includes a light transmitter for transmitting the light and a light receiver for receiving the light, and
the measurement holes are located in the support member between positions where the sensing unit transmits and receives the light to measure the position of the screen unit based on the amount of light received by the light receiver.

9. The display apparatus of claim 1, wherein the predetermined speed is a constant speed.

10. A display apparatus for a vehicle comprising:
a screen unit, a position of which is adjustable according to a normal driving mode in which a partial region is exposed on a cockpit module and an autonomous driving mode in which an entire region is exposed, and configured to output a corresponding screen;
a sensing unit configured to move together with the screen unit and located at both ends of the screen unit in a longitudinal direction to measure a position of the screen unit with an amount of light; and
a driver configured to determine a real-time position of the screen unit according to the amount of light measured from the sensing unit to adjust a position of the screen unit to expose the partial region of the screen unit when the vehicle is in the normal driving mode and to expose the entire region when the vehicle is in the autonomous driving mode with a predetermined speed and a predetermined path.

11. The display apparatus of claim 10, wherein the driver includes:

an actuator;
a driving shaft connected to rotate the actuator;
a pinion gear connected to the driving shaft to rotate in conjunction with the driving shaft;
a support member including an arch-shaped slit configured to guide a moving path of the driving shaft, and a plurality of measurement grooves each having an open surface and formed in a peripheral portion of the slit at different intervals along a longitudinal direction of the slit;
a rack gear engaged with the pinion gear connected to the support member; and
a moving bracket connected to the driving shaft and coupled to move together with the screen unit when the pinion gear moves along the rack gear due to the driving shaft, and
the moving bracket has the sensing unit coupled to an upper end thereof so that the sensing unit moves along an upper end of the support member.

12. The display apparatus of claim 11, wherein the measurement grooves are located between positions where the sensing unit transmits and receives the light.

13. The display apparatus of claim 11, wherein the sensing unit includes:
a fixing panel coupled to an upper end of the moving bracket;
a first substrate fixed to one end portion of the fixing panel in a downward direction and including a light-emitting sensor facing another end portion of the fixing panel; and
a second substrate fixed to another end portion of the fixing panel in a downward direction and including a light-receiving sensor having a predetermined separation distance from the light-emitting sensor so that the measurement grooves are located between the light-emitting sensor and the light-receiving sensor.

14. The display apparatus of claim 11, wherein the moving bracket is formed in a 'C' shape encompassing the support member and the pinion gear.

15. The display apparatus of claim 10, wherein:
the driver includes a support member including a plurality of measurement grooves formed at intervals along a longitudinal direction of the support members,
the sensing unit includes a light transmitter for transmitting the light and a light receiver for receiving the light, and
the measurement grooves are located in the support member between positions where the sensing unit transmits and receives the light to measure the position of the screen unit based on the amount of light received by the light receiver.

16. The display apparatus of claim 10, wherein the predetermined speed is a constant speed.

17. A display apparatus for a vehicle comprising:
a screen unit configured to output a corresponding screen according to a normal driving mode in which a partial region is exposed on a cockpit module and an autonomous driving mode in which an entire region is exposed;
a screen position driver configured to adjust a position of the screen unit to expose the partial region of the screen unit when the vehicle is in the normal driving mode and to expose the entire region when the vehicle is in the autonomous driving mode through rotation pop-up; and
a sensing unit located at both ends of the screen unit in a longitudinal direction and configured to move together with the screen unit and measure a position of the screen unit based on an amount of light measured by the sensing unit, wherein, when the position of the screen unit is adjusted by the screen position driver, the screen position driver controls driving of the screen unit according to either the amount of light measured by the sensing unit to control the screen position driver to set the amount of exposure of a display region of the screen unit in dependence on whether the vehicle is in the normal driving mode or in the autonomous driving mode or according to a measured current value according to a corresponding load applied by an external force to an actuator.

18. The display apparatus of claim 17, wherein the screen unit outputs only basic information related to a vehicle speed, a driving direction, and a sound source to the screen in the normal driving mode.

19. The display apparatus of claim 17, wherein the screen unit outputs a screen in which vehicle driving information and entertainment information are collected through a plurality of graphical user interfaces (GUIs) in the autonomous driving mode.

\* \* \* \* \*